US010764402B2

(12) United States Patent
Goel et al.

(10) Patent No.: US 10,764,402 B2
(45) Date of Patent: Sep. 1, 2020

(54) LEVERAGING TIME-WINDOWS GENERATED BY WEB BROWSER PRE-CONNECTIONS

(71) Applicant: Akamai Technologies, Inc., Cambridge, MA (US)

(72) Inventors: Utkarsh Goel, San Mateo, CA (US); Moritz Steiner, San Anselmo, CA (US); Yoav Weiss, Saint Donat sur l?Herbasse (FR)

(73) Assignee: Akamai Technologies, Inc., Cambridge, MA (US)

( * ) Notice: Subject to any disclaimer, the term of this patent is extended or adjusted under 35 U.S.C. 154(b) by 62 days.

(21) Appl. No.: 16/004,518

(22) Filed: Jun. 11, 2018

(65) Prior Publication Data

US 2019/0273808 A1    Sep. 5, 2019

Related U.S. Application Data

(60) Provisional application No. 62/638,072, filed on Mar. 3, 2018.

(51) Int. Cl.
*H04L 29/06* (2006.01)
*H04L 29/08* (2006.01)

(52) U.S. Cl.
CPC ............ *H04L 67/42* (2013.01); *H04L 65/602* (2013.01); *H04L 67/02* (2013.01); *H04L 67/26* (2013.01); *H04L 67/2842* (2013.01)

(58) Field of Classification Search
CPC ..... H04L 67/02; H04L 67/26; H04L 65/4069; H04L 65/4084; H04L 65/602; H04L 65/608; H04N 21/47202
See application file for complete search history.

(56) References Cited

U.S. PATENT DOCUMENTS

| | | |
|---|---|---|
| 6,820,133 B1 | 11/2004 | Grove et al. |
| 7,111,057 B1 | 9/2006 | Wein et al. |
| 7,240,100 B1 | 7/2007 | Wein et al. |
| 7,274,658 B2 | 9/2007 | Bornstein et al. |
| 7,296,082 B2 | 11/2007 | Leighton et al. |
| 7,376,716 B2 | 5/2008 | Dilley et al. |
| 7,472,178 B2 | 12/2008 | Lisiecki et al. |
| 7,603,439 B2 | 10/2009 | Dilley et al. |
| 7,660,296 B2 | 2/2010 | Fletcher et al. |
| 8,447,837 B2 | 5/2013 | Devanneaux et al. |
| 2011/0173345 A1 | 7/2011 | Knox et al. |
| 2013/0166634 A1 | 6/2013 | Holland et al. |
| 2016/0226969 A1 | 8/2016 | Jain et al. |
| 2016/0226998 A1 | 8/2016 | Jain et al. |

(Continued)

OTHER PUBLICATIONS

Jan Rüth, Benedikt Wolters, Oliver Hohlfeld, How HTTP/2 Pushes the Web: An Empirical Study of HTTP/2 Server, 2017 , Chair of Communication and Distributed Systems, RWTH Aachen University http://dl.ifip.org/db/conf/networking/networking2017/1570332989.pdf.*

(Continued)

*Primary Examiner* — Chirag R Patel

(57) ABSTRACT

Among other things, this document describes systems, methods and devices for content delivery from a server to a client, and in particular using certain windows of time on the server side—during which little or no activity is expected from a client application—to perform operations that will improve the speed of content delivery.

21 Claims, 5 Drawing Sheets

(56) References Cited

U.S. PATENT DOCUMENTS

| | | |
|---|---|---|
| 2016/0248866 A1 | 8/2016 | Garas et al. |
| 2016/0248867 A1* | 8/2016 | Alstad ................... H04L 67/26 |
| 2016/0330269 A1* | 11/2016 | Alstad ................... H04L 67/06 |
| 2016/0366233 A1* | 12/2016 | Le ........................ H04L 67/16 |

OTHER PUBLICATIONS

Adaptive Acceleration, downloaded on Jun. 7, 2018, 1 page, describing product available before Mar. 2018, Available at https://learn.akamai.com/en-us/webhelp/ion/oca/GUID-71696E04-B326-4FD1-9F2C-0A0FDFE40726.html.

Aikamai, ION product brief, published Nov. 2017.

Blake-Wilson, et al., RFC 3456, Transport Layer Security (TLS) Extensions, Jun. 2013, 29 pages.

Grigorik, High Performance Networking in Google Chrome, Jan. 31, 2013, 23 pages.

Oku, et al., IETF, Cache Digest for HTTP/2, draft-ietf-httpbis-cache-digest-03, Mar. 1, 2018, 18 pages, Available at https://lists.w3.org/Archves/Public/ietf-http-wg.

Oku, IETF, RFC 8297, An HTTP Status Code for Indicating Hints, Dec. 2017, 7 pages.

Pardue, IETF, Unbound Server Push (USP) for HTTP/QUIC, Jan. 29, 2018, 5 pages. Available at http://datatracker.ietf.org/drafts/current.

Resource Hints, W3C Working Draft—Specification, document published Jan. 15, 2018, 20 pages of web printout downloaded Jun. 28, 2018.

* cited by examiner

LEVERAGING TIME-WINDOWS GENERATED BY WEB BROWSER PRE-CONNECTIONS

BACKGROUND

Technical Field

This application relates generally to the delivery of content from servers to client applications such as web browsers.

Brief Description of the Related Art

Client devices run web browser applications to fetch and display web pages for users. A browser typically requests web page resources from a server using HTTP 1.1, HTTP/2, or QUIC. A markup language document (e.g., HTML) defines the presentation of a web page. The HTML may reference resources such as images, CSS, other HTML documents, scripts, and the like; the browser finds these references and requests them from the appropriate server, as well.

There are a variety of different web browsers in use today, including Google Chrome, Mozilla Firefox, Microsoft Edge, Apple Safari, and others. The teachings of this document not only provide a better understanding of how browsers operate in the real world but also provide performance enhancements on the server side. The teachings hereof address a technical need, providing improved computer methods, systems, and apparatus for delivering web pages more quickly and efficiently.

Those skilled in the art will understand these and other improvements from the teachings hereof.

BRIEF SUMMARY

Among other things, this document describes systems, methods and devices for content delivery from a server to a client application, and in particular using certain windows of time—during which little or no activity is expected from a client application—for the server to perform operations that will improve the speed of content delivery.

In a related aspect, explored herein are potential implications of client application (such as web browser) predictors on web performance and content delivery network (CDN) infrastructure. HTTP requests on many connections arrive on the server only after some time, potentially leaving a gap of time where the connection is idle right after it is established. Such a gap of time is referred to herein as a time-window. Discussed herein are techniques in which a server and/or a CDN could take advantage of this time-window and potentially improve performance.

The foregoing is a description of certain aspects of the teachings hereof for purposes of illustration only; it is not a definition of the invention. The claims define the scope of protection that is sought, and they are incorporated by reference into this brief summary.

BRIEF DESCRIPTION OF THE DRAWINGS

The invention will be further understood from the following detailed description taken in conjunction with the accompanying drawings, in which.

Figure 1:
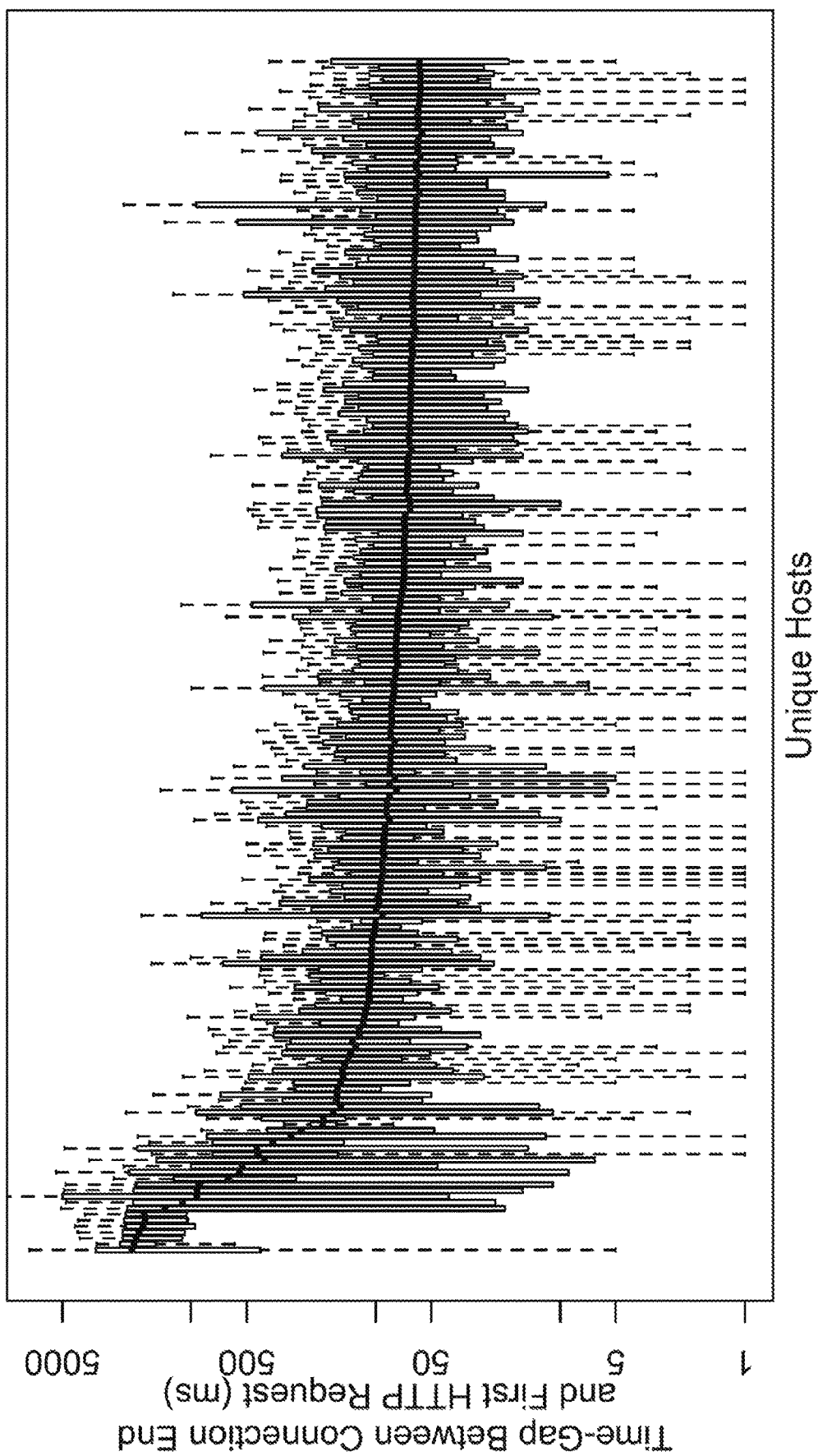
FIG. 1 is a boxplot distribution of time-windows observed across different hosts during a time period.

It should be understood that labels on the drawings are merely for reference purposes and generally use even numbers simply for convenience of avoiding renumbering should future amendments require intermediate elements.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2. HTTP over QUIC. TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a typical client application is a web browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document.

The terms 'object' and 'resource' are used interchangeably in this patent document.

The terms 'domain name' and 'hostname' are used interchangeably in this patent document.

INTRODUCTION

In the HTTP/2 protocol, servers can push content only if there has been at least one request initiated by the client. Of course, this is the current situation and might change. For example, a recently proposed IETF draft allows servers to push content on an HTTP/2 connection without the need for any client request. (L. Pardue, IETF Draft, Jan. 29, 2018 Unbound Server Push (USP) for HTTP/QUIC draft-pardue-quic-http-unbound-server-push-00).

If that draft or a similar functionality is used, servers could push content without waiting for a client request. The teachings hereof propose several improvements related to actions that a server can take before receiving a client request, including server push and other things.

According to the teachings hereof, a server can utilize sufficiently large gap or delay in client request activity, referred to herein as time-windows, to take certain actions. For example, the server could use that time to learn the contents of a client application's cache (e.g., a web browser cache) and thereafter avoid pushing resources that are already in cache. This approach could be used as an alternative to the use of cache-digests, which are described in K. Oku, IETF Mar. 1, 2018, Cache Digests for HTTP/2, draft-ietf-httpbis-cache-digest-02.

Another technique is to enable servers to prefetch popular content, again potentially during such time-windows, from neighboring peers on the receipt of the server name indication (SNI) host header during a transport layer security (TLS) connection establishment.

The teachings of this document will be now be described in more detail.

Technical Problem—Client Preconnects and Time-Windows

The HTTP/2 protocol allows servers to push resources only after a context is established. As such, servers are supposed to start transmitting PUSH_PROMISE frames only after the receipt of the first HTTP request on a given connection. Web browsers, such as Chrome, have built-in predictor logic that learns user browsing behaviors and the resources embedded on different webpages. As such, to improve performance, the built-in predictor instructs the browser to proactively connect to multiple hosts upon navigation to a page. For example, the built-in predictor in the browser might determine that the browser should connect to host A, host B, host C when the user navigates to a webpage on host X. When browsers take actions based on such predictions, they often end up establishing connections long before an HTTP request is sent on the connection. The term connection here refers to a transport layer connection, typically TCP, and often secured by TLS (a TCP connection secured by TLS is often referred to as a TLS connection). In a recent investigation, we discovered that the time-window between the end of connection establishment (from the server's perspective) and the receipt of the first HTTP request could be as large as four seconds, in the median case. This means the connection could be idle for four seconds after connection establishment.

FIG. 1 is boxplot distribution of time-windows observed across about 200 hosts, as reflected in over 7.3 million HTTP log lines (r-lines) pertaining to HTTP/2 connections opened from Chrome browsers to about 500 different servers.

The x-axis in FIG. 1 shows time-gap distribution observed across the 200 hostnames. The y-axis shows the time-gap in milliseconds. As shown in the figure, on a proactively established connection the first HTTP request could arrive on the server as late as four seconds in the median case after the connection establishment. However, for most hostnames, the first request arrives about 50 milliseconds after the end of connection establishment. Such large time-gaps are equivalent to several round trips in wired broadband networks and fewer round trips in fast mobile networks. Based on the experimental data, this behavior appears to apply only to hostnames associated to subresources embedded in the HTML.

Because the HTTP/2 protocol allows the client to dispatch an HTTP request right after the client finishes its part of connection establishment and sends its HTTP/2 SETTINGS frame, theoretically the time-windows should all be essentially zero. But because browsers proactively open several connections upon navigation to a page, one can observe time-windows due to browsers needing to spend time to discover and identify resources for which they need to sent requests on the proactively opened connections (e.g., found in the HTML, revealed in Javascript execution, or otherwise, etc.) that need to be fetched on the connection.

As mentioned above, today the HTTP/2 protocol standard limits the actions that servers can take during the time-windows we have identified, hence limiting the server's ability to improve content delivery performance in this area.

Learning the Content of a Client-Side Cache During Time-Windows

As noted earlier, an IETF unbounded-server-push (USP) draft proposes that the servers be allowed to push resources without the need for a client request to come first. With this or similar functionality adopted into the ecosystem, a server could take several a variety of actions during the time that it is waiting for an initial request to come from a client on an HTTP/2 or QUIC connection. One such action is that the server could push resources to the client and potentially improve web performance. However, if the browser pushes resources that are in the client's cache already, this effort and the time-window is wasted.

According to the teachings hereof, it is proposed that the time-window be used to detect the availability of resources in the browser's cache. Put another way, the server can use the time-window on a newly established connection to learn or probe the contents of a client-side cache (e.g., the browser cache).

For example, instead of pushing a resource to the client in the time-window, the server can send an HTTP/2 PUSH_PROMISE frame for a resource and wait for a configurable amount of time (preferably the round trip time, or RTT, on the connection) before pushing the actual resource. The usefulness of delaying the pushing the resource is that if the client has the promised resource in its cache, it will send a RST_STREAM frame which the server could use to detect whether that resource is in client's cache and therefore avoid pushing that resource.

If the server does not receive a RST_STREAM frame during the time-window (or any other similar indication from the client that the resource was already in the client's cache), the server can conclude that the client does not already have it in cache and begin pushing the resource. This technique allows servers to learn whether or not the objects they would like to push are already in client's cache, without the need of client's support for cache-digests or other similar mechanisms; the client merely needs to comply with HTTP/2 or an equivalent protocol that enables PUSH- _PROMISE and RST-STREAM messaging or equivalent. Preferably, the time-window is not used for pushing resources but to learn the contents of the client's cache. In a sense, the server uses the time-window to probe the client cache and discovers at least some of its contents.

Also, the server could use the time-window to early-hint resources that the client is likely to request on the connection. Early hinting is a known technique described in the IETF RFC 8297 specification. Although that early-hint specification allows servers to send intermediate responses only after receiving a request, in the future, techniques could be developed that allow servers to send messages (similar in nature to early-hint) without the need for a client request beforehand. Therefore, in this document, when we reference to an "early-hint" we are referring to that future version of early-hint.

Using Time-Windows to Prefetch Based on SNI

Without knowing why a connection is established by a client, the server cannot make decisions as to what resources to check availability for in client's cache. This is because at the time of the connection setup, in a TLS connection, only the SNI host header is available to the server. (For background on Server Name Indication (SNI), see, e.g., IETF RFC 3546, Section 3.1.) Because there could be hundreds or even thousands of resources associated to a single hostname, at the time of connection establishment, the server does not know what web page (and therefore associated resources) that the client is processing and hence does not know what resources the server needs to push, prefetch, or otherwise act on, during the time-window.

In accordance with the teachings hereof, a server processing a client request could ask an offline analysis service (OAS) that asynchronously and periodically parses historic HTTP logs collected during the past few hours (e.g., from the server platform) and based thereon generates and maintains a list of resources that are most often requested for each hostname. Given this resource list and a newly established client connection in which the client provides a hostname in an SNI field, the server can consult the SNI field to find the hostname, determine the resources that are on the OAS's list for that hostname, and send PUSH_PROMISE frames for some or all resources suggested by the list, while it is waiting for the first HTTP request to arrive on the connection.

Preferably, the server sends the PUSH_PROMISE frame only if the historic data suggests that in the median case there have been sufficiently large time-windows (for example, >20 ms) for the hostname in question. This restriction does not apply to a server sending early-hints for resources because the server does not send the content of the resource in an early-hint and therefore, even if the time-window is small, the client could take early actions on early-hints.

The OAS can annotate the list of resources for a given hostname with data about the median time-windows. The OAS can get this data from the log lines, assuming that servers measure and provide the time-windows and record them in the logs.

Note that the time-windows will be different depending of the network the client is connected to. For example, connections from a cellular network might see larger gaps as opposed to a fiber network. Therefore, the client access network performance needs also can be considered in the analysis, to improve accuracy; this is referred to as "connection type" or "network type" herein. The OAS could list median (or other configured percentile value) time-windows for categories of clients. For example, a median time-window can be given as valid for a list of connection types when connecting to a hostname. Upon consulting the list, the server can match the connection type of the current client to this list and determine which time-window it should use. A server can determine the connection type of the current client by for example using the server's kernel provided RTT measured for establishing the connection as one way to estimate client's network performance; alternatively, the server can use service that maps source IP address to a connection type, an example of such a service being EdgeScape provided by the assignee hereof. Connection types could be described using quantitative or qualitative labels. For example, connection type could be indicated by round trip time, e.g., connection type=10 ms, or connection type=200 ms. Connection type can also be indicated by the kind of network, which carries with it an implied although general level of performance. For example, connection type=cellular; connection type=Wifi, or connection type=cellular, 4G.

Another factor that the OAS can take into account before suggesting potential candidate resources to the server is the 'max-age' of the resources, also referred to as a the cache lifetime or time to live. The OAS could be configured to only keep track of resources that have a max-age of some threshold value (e.g., 3600 seconds, one hour). Similarly, OAS could be configured to suggest or keep track of non user-personalized, static assets that do not require the presence of cookies in the request or responses.

Figure 2:
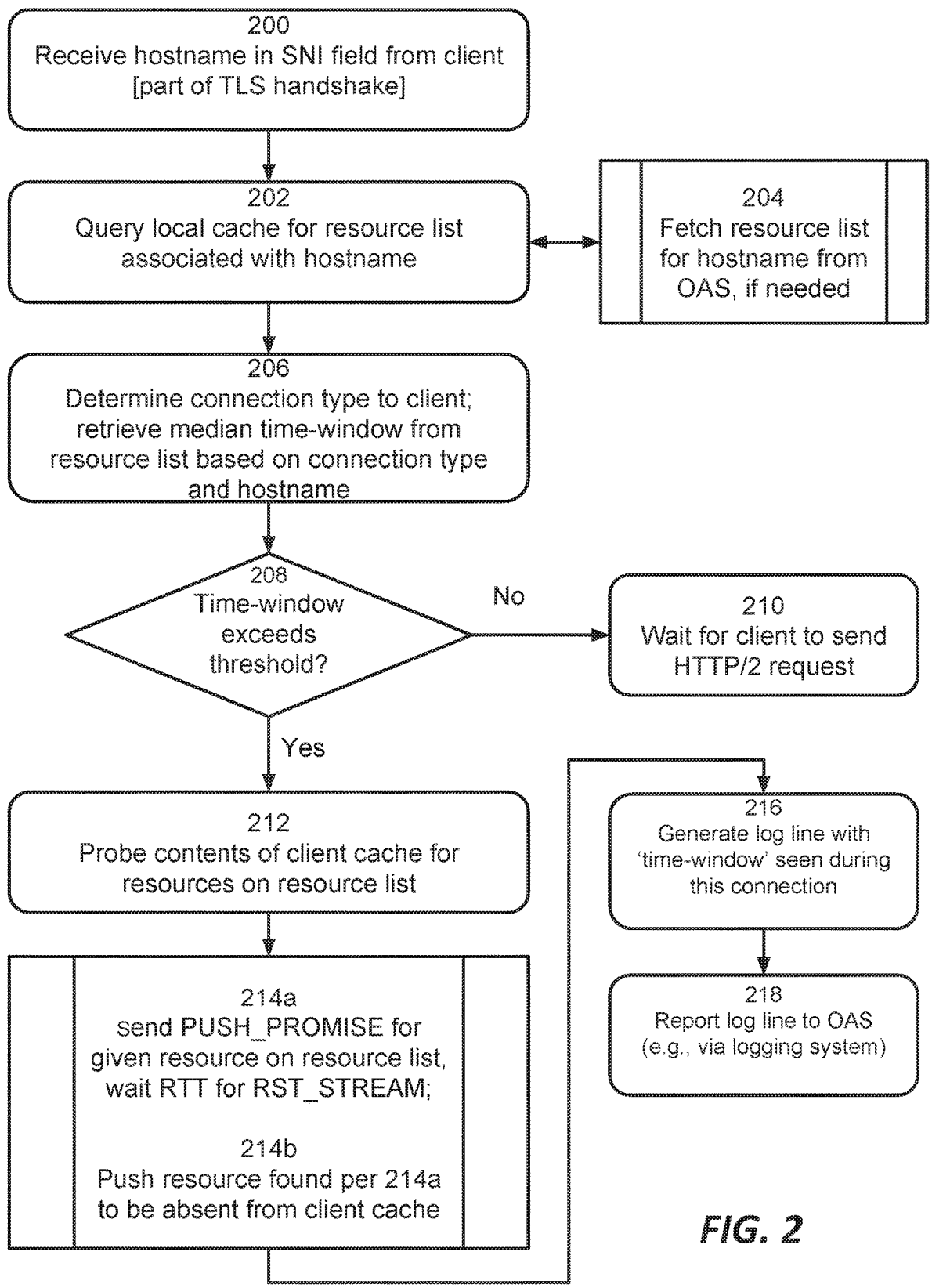
FIG. 2 is a flow diagram illustrating processing steps in a client facing content server, in accordance with the teachings hereof, in one embodiment.

FIG. 2 is a flow diagram illustrating an embodiment of logic executing at the server to probe a client's cache during a time-window, if the time-window for the hostname and client connection type are sufficiently large. In FIG. 2, at 200 the server receives a hostname in the SNI field as part of a TLS handshake. At 202, the server looks up (in its local cache or other storage structure) the appropriate resource list for that hostname. At 204, the server fetches the appropriate resource list, if it is not cached locally. At 206, the server determines the connection type to a client, and based on the hostname and the connection type, looks up the expected time-window. If the expected time-window doesn't exceed a configurable threshold, then the server simply waits for the first client request (at 210, via 208). If the expected time-window exceeds the threshold at 208, then at 212 the server proceeds to use that expected time to probe the contents of the client's cache, which is done for example by the process of 214a (send PUSH_PROMISE and wait RTT for RST_STREAM). When, in 214a, the server discovers that the client cache does not contain a given object, the server pushes the object in 214b. Eventually the client will send a request, ending the time-window. In an optional reporting process shown at 216-218, the server can measure the time-window actually seen on this connection, and report that data via log lines to the OAS. In this way, the OAS can refine its statistics on expected time-windows based on real-world and updated data.

Figure 3:
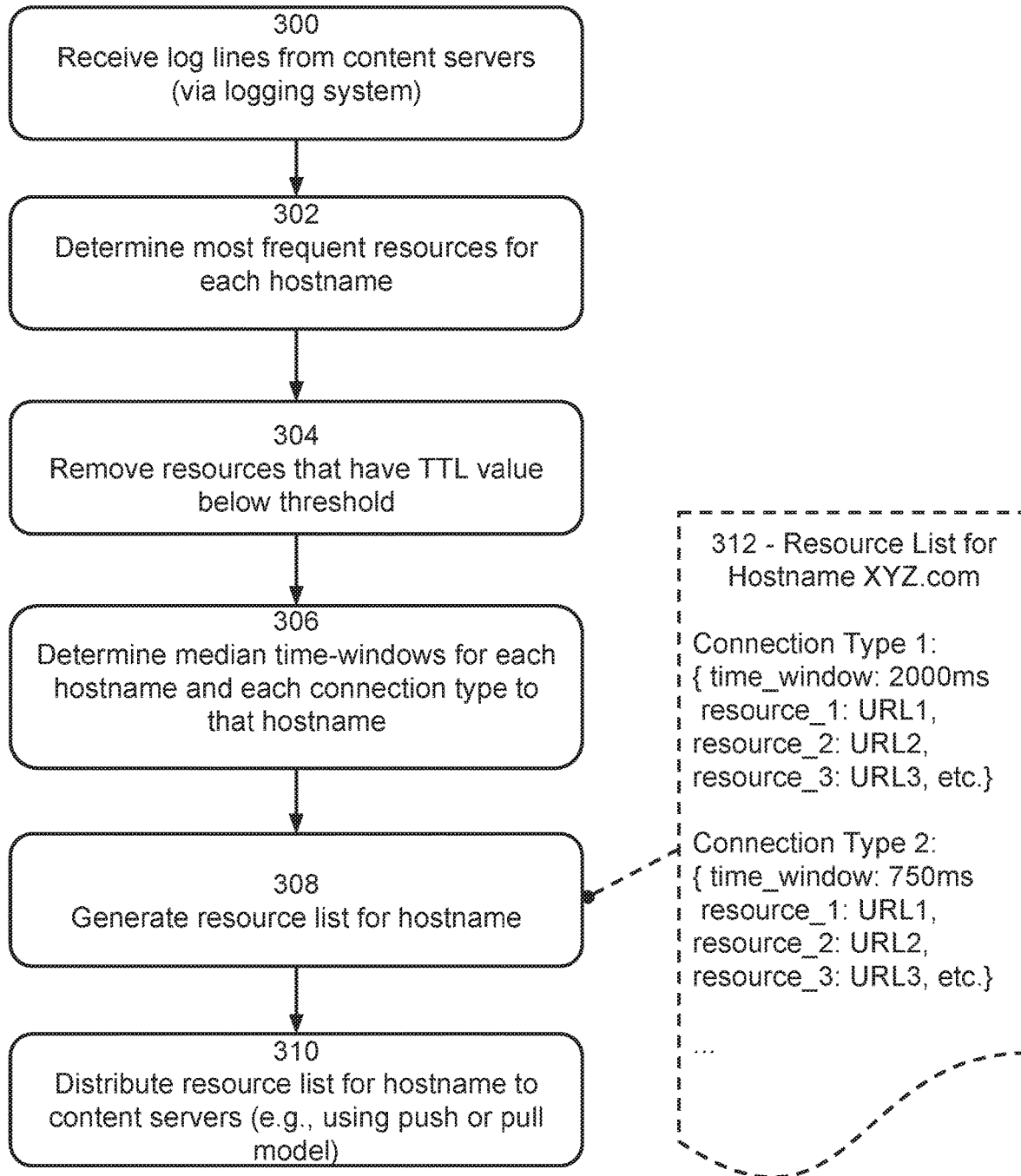
FIG. 3 is a flow diagram illustrating processing steps performed by an offline analysis service, hosted in a server machine, in accordance with the teachings hereof, in one embodiment.

FIG. 3 is a flow diagram illustrating an embodiment of logic executing at the OAS to generate a resource list for the server to use in FIG. 2, based on reported log lines. At 300), the OAS receives log lines from the servers (e.g., as just described with respect to 216-218). At 302 the OAS determines the most frequently requested resources for each hostname appearing in logs; at 304 resources that are assigned a TTL value below a threshold amount are removed. At 306, the OAS determines the expected time-window for each hostname and each connection type to that hostname; the results are placed into a resource list 312 at step 308. At 310, the resource list is made available to servers to fetch, or pushed to them, or distributed in any other manner.

Both FIGS. 2 and 3 reflect non-limiting embodiments.

Implementations of OAS

The OAS could function in a variety of ways. The OAS could parse the HTTP logs to identify popular referrers that appear for first HTTP request on a connection to a given hostname. In the cases where one or more popular referrers are identified, the OAS could fetch and parse the identified referrers to find URIs associated to the hostname in question. Preferably, the OAS should not suggest or keep track of referrers that point to search engine URLs, third-party analytics scripts, or are empty in the HTTP log lines.

It is known in the art to use real user monitoring data (including data captured from Navigation Timing and Resource Timing APIs) to select resources for server to push on HTTP/2 connection. An example is Adaptive Acceleration (A2) provided by Akamai Technologies, Inc., the assignee hereof. In one embodiment, the OAS could use Adaptive Acceleration (A2) (or similar services) policies to identify common resources for a given hostname and instruct the server to send a PUSH_PROMISE frame for all such resources as soon as the connection is established, in cases where the historic data suggests that the first request from the client would likely arrive after some time (that is, after a time-window of a sufficient size).

The OAS could use both A2 policies to instruct the server to send PUSH_PROMISE for common resources as well as identify a referrer for which it could extract page-specific resources using A2 policies and send PUSH_PROMISE frames for them.

Resource Prefetching During Time-Windows

Servers in content delivery networks (CDNs) are often designed to proactively fetch content from their neighboring or hierarchical peers in the CDN network (or even from the origin). See, e.g., U.S. Pat. Nos. 8,447,837 and 7,603,439, the teachings of both of which are hereby incorporated by reference. Such proactive prefetching allows the servers to reduce delivery latency when the needed resources are not in server's cache. However, the servers can only prefetch resources after they receive a request from the client because the servers need to have a basis for predicting or knowing what resources the client will need in the future. As a result, servers waste the time during the time-windows identified earlier. This is can be particularly problematic because such time-windows often vary from a few dozen milliseconds to several seconds; instead the servers could use the time-window to prefetch resources from its peers or from the origin. Prefetching can be useful when a resource is not in the server cache and is needed to be fetched from a peer server or a distant origin.

In accordance with the teachings hereof, a server can determine whether a client connection is likely to experience significant time-windows, and if so, use that time to prefetch resources from neighboring servers and/or cache parents and/or origin servers.

The server could utilize the OAS, as described before, to learn whether or not it is likely to experience a large time-window for a connection to a given hostname (assuming the availability of SNI host header). Upon connection establishment, the server could utilize the time-window to prefetch resources from its neighboring peers or from the origin server, if the time-windows for the hostname in the SNI host header field have been observed to be large enough to accommodate the time needed to prefetch, e.g., above a specified threshold. The threshold could be manually set, or could be dynamically adjusted from time to time by the server based on recent round trip time measurements to neighboring servers, cache parents, and/or origin servers.

Of course, in some embodiments, the server could simply prefetch based on the hostname in the SNI field, regardless of how long the time-windows have been. (Put another way, a threshold of 'zero'.)

The server can identify the resources to prefetch based on the most frequent resources requested per hostname, based on historical data, or based on a configuration file at the server that was specified by a content provider associated with hostname (for hostname X, prefetch objects A,B,C), or otherwise.

Server CPU Load Considerations

The techniques proposed above make use of the suitably large time-windows observed from the server side. The server may need to spend resources (network and/or CPU cycles) communicating to the OAS, in some embodiments described above—and those resources might have been used for other purposes. For example, the server could have used that time to serve the first client request, if it had arrived. Preferably, as soon as the server actually receives a client request, it prioritizes serving that request and spends minimal resources taking actions on resources identified by OAS. This can be implemented by de-prioritizing the OAS related actions and/or making their performance conditional on a check that no client request is pending.

Websites with Content Hosted Under Multiple Domains

Content providers sometimes configure their websites such that they have a primary domain serving dynamic content and one or more secondary domains serving static content such as images. The teachings hereof can be used with this kind of website structure.

For example, assume that server A is responsible for serving the basepage HTML to the client on a primary domain, and that server B is responsible for serving a resource embedded in the base page HTML and hosted on a secondary domain, such as an image resource.

Given this arrangement, one advantage is the ability to react to preconnections the browsers make to those secondary domains. For example, in one implementation, server A could send a message to Server B that Server B is expected to receive a connection from a client IP address seen by Server A. Server A could make this determination, for example, after receiving a client request for an HTML document, by searching HTML document to find a hostname or address associated with Server B.

The advance notice received by Server B will enable server B to proactively prefetch the resources suggested by OAS and send push promises to the client as soon as the connection is available. Server B does not need to wait for the connection establishment from the client before fetching the resources. Additionally, if Server A parses the requested HTML (and embedded resources associated to Server A's hostname) and communicates to Server B a list of resources associated to Server B's hostname, Server B could proactively send a PUSH_PROMISE, early-hint, and/or prefetch those resources as soon as the connection to the client is established, without the need of contacting the OAS.

Use in Content Delivery Networks

As suggested above, the teachings hereof may be implemented in a system in which the server taking advantage of the time-windows is a server in a CDN (e.g., server 402 described below). A description of a conventional CDN is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 4:
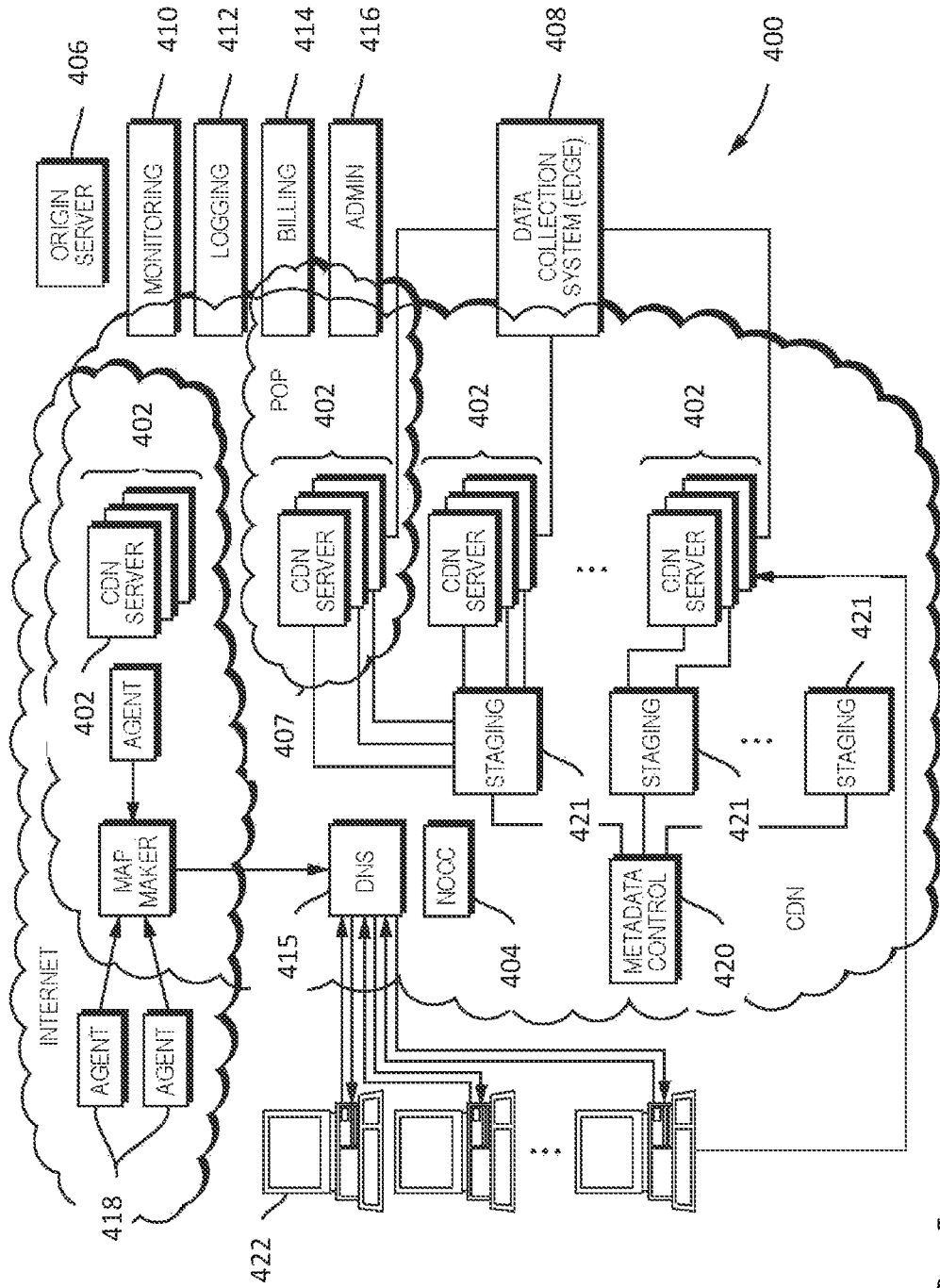
FIG. 4 is a block diagram of a content delivery network in which the teachings hereof may be implemented; and, FIG. 5 is a block diagram illustrating hardware in a computer system that may be used to implement the teachings hereof.

In a known system such as that shown in FIG. 4, a distributed computer system 400 is configured as a content delivery network (CDN) and is assumed to have a set of server machines 402 distributed around the Internet. Typically, most of the machines are configured as servers and located near the edge of the Internet, i.e., at or adjacent end user access networks. A network operations command center (NOCC) 404 may be used to administer and manage operations of the various machines in the system. Third party sites affiliated with content providers, such as web site 406, offload delivery of content (e.g., HTML or other markup language files, embedded page objects, streaming media, software downloads, and the like) to the distributed computer system 400 and, in particular, to the servers 402 (which are sometimes referred to as content servers, or sometimes as "edge" servers in light of the possibility that they are near an "edge" of the Internet). Such servers may be grouped together into a point of presence (POP) 407.

Typically, content providers offload their content delivery by aliasing (e.g., by a DNS CNAME) given content provider domains or sub-domains to domains that are managed by the service provider's authoritative domain name service. End user client machines 422 that desire such content may be directed to the distributed computer system to obtain that content more reliably and efficiently. The CDN servers respond to the client requests, for example by obtaining requested content from a local cache, from another CDN server, from the origin server 406, or other source.

Although not shown in detail in FIG. 4, the distributed computer system may also include other infrastructure, such as a distributed data collection system 408 that collects usage and other data from the CDN servers, aggregates that data across a region or set of regions, and passes that data to other back-end systems 410, 512, 414 and 416 to facilitate monitoring, logging, alerts, billing, management and other operational and administrative functions. Distributed network agents 418 monitor the network as well as the server loads and provide network, traffic and load data to a DNS query handling mechanism 415, which is authoritative for content domains being managed by the CDN. A distributed data transport mechanism 420 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 402 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "Net-Storage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
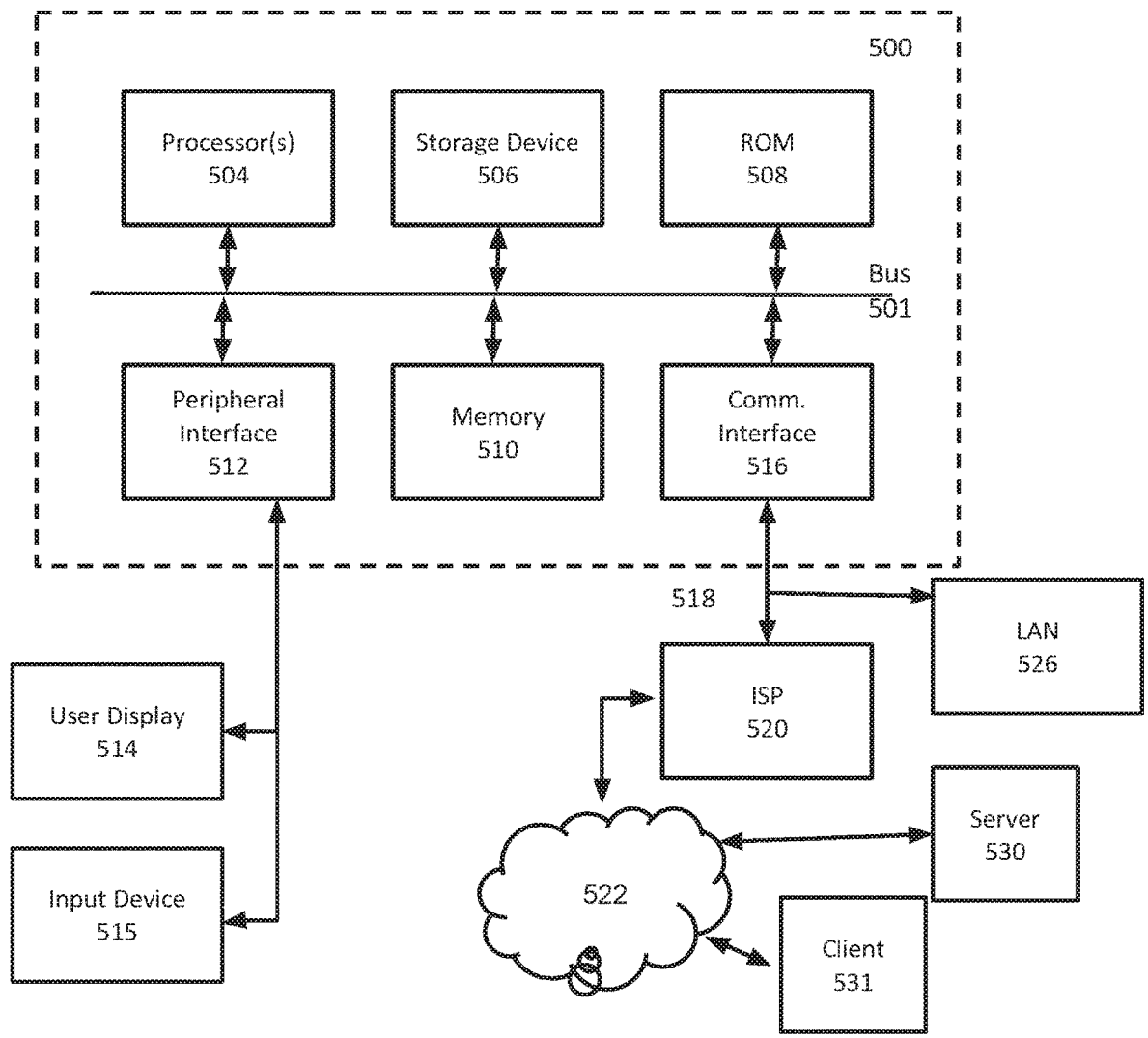

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry, control and/or level-shifting logic for local buses such as RS-485. Universal Serial Bus (USB), IEEE 1394, or other communication links.

Computer system 500 is coupled to a communication interface 516 that provides a link (e.g., at a physical layer, data link layer) between the system bus 501 and an external communication link. The communication interface 516 provides a network link 518. The communication interface 516 may represent a Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 518 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for accelerating the delivery of web content from a server to a client, the method performed by the server and comprising:
   establishing a transport layer connection with a client, the transport layer connection carrying at least one HTTP/2 stream;
   in response to the establishment of the transport layer connection, determining a size of an expected time-window, the expected time-window comprising a period of time during which the at least one HTTP/2 stream is expected to be idle immediately after the establishment of the transport layer connection and before the client sends a first HTTP request via the transport layer connection and the at least one HTTP/2 stream;
   determine whether the size of the expected time-window exceeds a threshold;
   in response to a determination that the size of the expected time-window exceeds the threshold, taking an action during the expected time-window, the action comprising at least one of:
   (i) probing the contents of a cache of the client to determine whether the cache of the client stores one or more web resources, and
   (ii) prefetching one or more web resources to the server from another server.

2. The method of claim 1, wherein determining the size of the expected time-window comprises: receiving, from an asynchronous analysis service, the size of the expected time-window size associated with a hostname received from the client prior to said step of determining the size of the expected time-window.

3. The method of claim 1, wherein the action comprises (i) probing, and the probing the contents of the cache of the client comprises: sending at least one PUSH_PROMISE frame to the client for one or more web resources and determining whether the client responds with a RST_STREAM frame.

4. The method of claim 1, wherein the action comprises (i) probing and the probing the contents of the cache of the client comprises:
   sending at least one PUSH_PROMISE frame to the client for one or more web resources and waiting for at least one round trip time to the client before taking an action.

5. The method of claim 1, wherein the transport layer connection comprises a TLS-secured TCP connection.

6. The method of claim 1, further comprising selecting the one or more web resources based at least in part on a hostname received from the client during the establishment of the transport layer connection.

7. The method of claim 1, further comprising, selecting the one or more web resources, based at least in part on a hostname received in a server name indication (SNI) header field from the client.

8. The method of claim 1, further comprising performing the following steps with an asynchronous analysis service:
   learning the web resources most often fetched by clients for a hostname;
   creating a list of such web resources;
   providing the list to the server so that the server can determine the one or more web resources.

9. The method of claim 1, further comprising performing the following steps with an analysis service:
   determining the size of the expected time-window for a hostname;
   sending the size of the expected time-window to the server.

10. The method of claim 1, wherein the action comprises prefetching the one or more resources, and the prefetching comprises the server requesting the one or more resources from another server during the expected time-window.

11. The method of claim 1, wherein the expected time-window is a result of a client browser pre-connect.

12. A method operative with one or more servers, the method comprising:
   for a particular hostname, determining first information about the size of a time-window between clients' transport layer connection establishment and an initial content request sent by the clients over the transport layer connection;
   determining second information about resources most often fetched by clients for the particular hostname;
   establishing a particular transport layer connection with a particular client, and receiving the particular hostname from the particular client prior to receiving any content request from the particular client over said particular transport layer connection;
   based on the first and second information, taking at least one of the following actions during the time-window:
   (i) probing the particular client's cache by sending one or more HTTP/2 PUSH_PROMISE frames for one or more resources, and
   (ii) prefetching one or more resources identified by the second information to the server.

13. The method of claim 12, wherein the particular hostname is received from the particular client in a server name indication (SNI) field.

14. An apparatus comprising a computer having circuitry forming at least one processor and at least one memory device storing computer program instructions for execution by the at least one processor to operate the computer to:
   establish a transport layer connection with a client, the transport layer connection carrying at least one HTTP/2 stream;
   in response to the establishment of the transport layer connection, determine a size of an expected time-window, the expected time-window comprising a period of time during which the at least one HTTP/2 stream is expected to be idle immediately after connection the establishment of the transport layer connection and before the client sends a first HTTP request via the transport layer connection and the at least one HTTP/2 stream;

determine whether the size of the expected time-window exceeds a threshold;

in response to a determination that the size of the expected time-window exceeds the threshold, take an action during the expected time-window, the action comprising at least one of:
(i) probe the contents of a cache of the client to determine whether the cache of the client stores one or more web resources, and
(ii) prefetch one or more web resources to the server from another server.

15. The apparatus of claim 14, wherein the computer program instructions include instructions to cause the computer to determine the size of the expected time-window at least by: receiving, from an asynchronous analysis service, the size of the expected time-window associated with a hostname received from the client prior to said step of determining the size of the expected time-window.

16. The apparatus of claim 14, wherein the action comprises (i) probing, and the probing the contents of the cache of the client comprises: sending at least one PUSH_PROMISE frame to the client for one or more web resources and determining whether the client responds with a RST_STREAM frame.

17. The apparatus of claim 14, wherein the action comprises (i) probing and the probing the contents of the cache of the client comprises:
sending at least one PUSH_PROMISE frame to the client for one or more web resources and waiting for at least one round trip time to the client before taking an action.

18. The apparatus of claim 14, wherein the transport layer connection comprises a TLS-secured TCP connection.

19. The apparatus of claim 14, wherein the computer program instructions include instructions to cause the computer to select the one or more web resources based at least in part on a hostname received from the client during the establishment of the transport layer connection.

20. The apparatus of claim 14, wherein the action comprises prefetching the one or more resources, and the prefetching comprises the server requesting the one or more resources from another server during the expected time-window.

21. A system comprising one or more computers, each having circuitry forming at least one processor and at least one memory device storing computer program instructions for execution by the at least one processor, said execution causing the one or more computers to:

for a particular hostname, determine first information about the size of a time-window between clients' transport layer connection establishment and initial content request;

determine second information about resources most often fetched by clients for the particular hostname;

establish a particular transport layer connection to a particular client, and receive the particular hostname from the particular client prior to receiving any content request from the particular client over the particular transport layer connection;

based on the first and second information, take at least one of the following actions during the time-window:
(i) probe the particular client's cache by sending one or more HTTP/2 PUSH_PROMISE frames for one or more resources, and
(ii) prefetch one or more resources identified by the second information to the server.

* * * * *